Aug. 15, 1939.    D. D. GOLDBERG    2,169,525
VALVE MANUFACTURE
Filed Oct. 20, 1937    2 Sheets-Sheet 1

INVENTOR.
David D. Goldberg.
BY
ATTORNEY.

Aug. 15, 1939.　　　D. D. GOLDBERG　　　2,169,525
VALVE MANUFACTURE
Filed Oct. 20, 1937　　　2 Sheets-Sheet 2
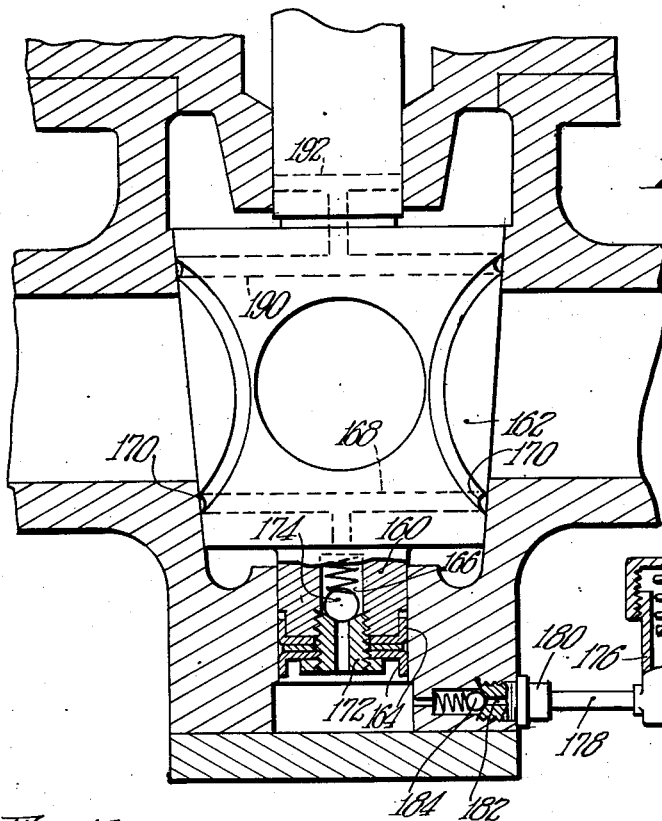
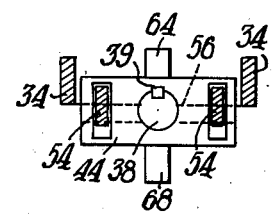
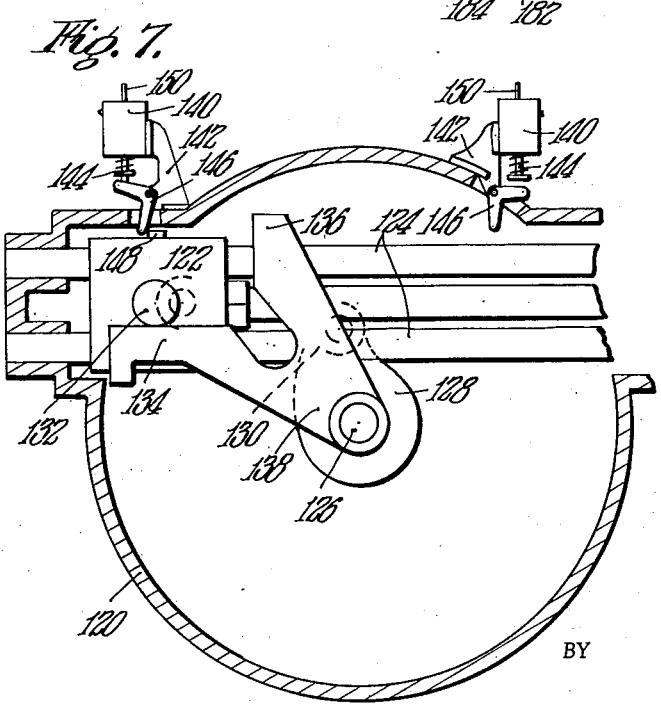
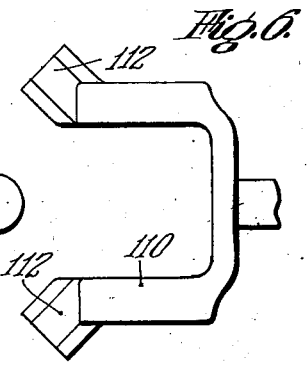
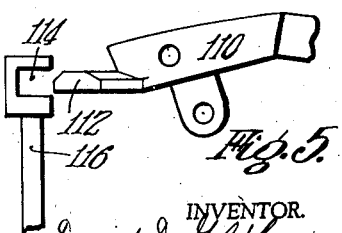
INVENTOR.
David D Goldberg
ATTORNEY.

Patented Aug. 15, 1939

2,169,525

UNITED STATES PATENT OFFICE 2,169,525

VALVE MANUFACTURE

David D. Goldberg, Springfield, Mass., assignor to Chapman Valve Manufacturing Company, Indian Orchard, Mass., a corporation of Massachusetts Application October 20, 1937, Serial No. 170,000

2 Claims. (Cl. 251—93)

This invention relates to improvements in valve apparatus and is directed more particularly to improvements in cone valves and the like.

According to the principal objects of the invention a cone valve is provided which includes a body having a tapering seat or bore, a cone or plug, and novel operating means to move the plug axially between seated and non-seated positions and rotate the same between open and closed positions.

According to another object of the invention, means is provided for feeding a sealing and/or lubricating medium which is operable to supply the lubricant or sealing medium to the coacting surfaces of the plug and valve body and journal parts not only to seal the joints but to act as a lubricant to facilitate operation, the said means being operable accordingly as the plug is moved from one position to another.

Various novel features and advantages of the invention will be hereinafter more fully referred to in connection with the accompanying description of the present preferred form of the invention reference being had to the accompanying drawings, wherein:

Fig. 5 is a fragmentary side elevational view of certain parts of a valve apparatus to illustrate a modified form of the invention;

Fig. 6 is a plan view of the parts shown in Fig. 5;

Fig. 7 is a plan view of valve operating mechanism illustrating another modified form of the invention;

Fig. 8 is a sectional elevational view of a valve to illustrate a further modified form of the invention; and Fig. 9 is a sectional plan view through the spindle approximately at the upper side of the yoke.

Figure 1:
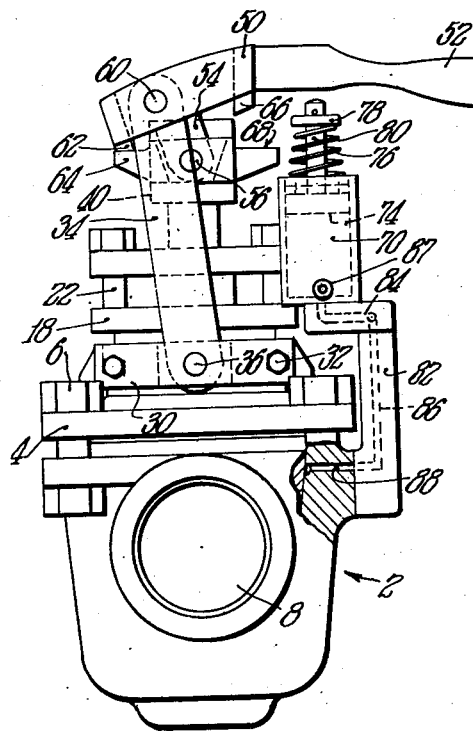
Fig. 1 is an elevational view of a valve apparatus embodying the novel features of the invention.

Referring now to the drawings more in detail, the invention will be fully described.

Figure 2:
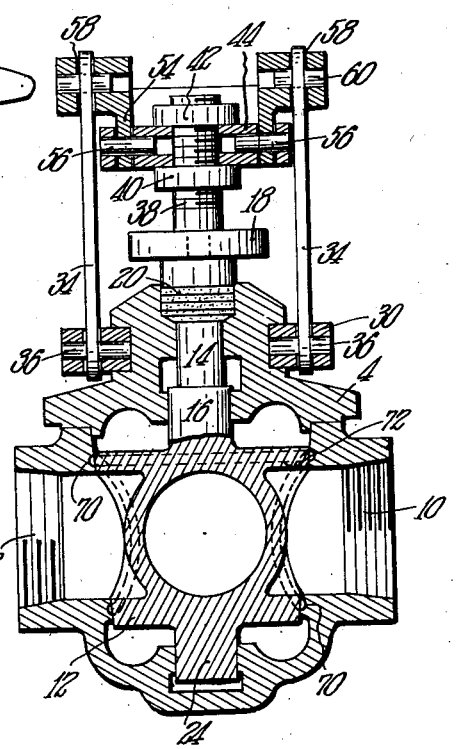
Fig. 2 is a longitudinal sectional elevational view of the valve apparatus shown in Fig. 1.
Figure 3:
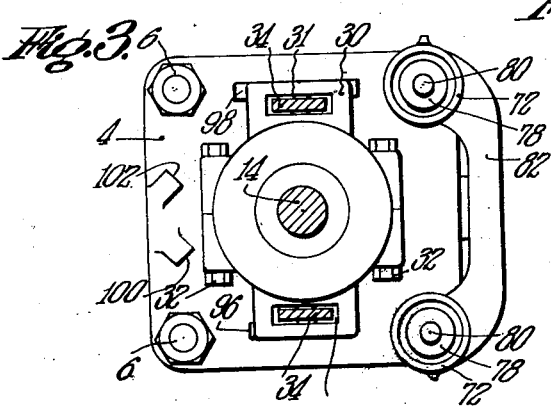
Fig. 3 is a plan view of the valve apparatus shown in Fig. 1 with parts removed for clearness.

The valve apparatus shown in Figs. 1, 2 and 3 includes a body 2 and a cap 4 which may be secured together in some suitable manner as by bolts 6. The body 2 is provided with inlet and outlet ports 8 and 10 which may be screw-threaded as shown for receiving a pipe or said ports may be flanged or otherwise provided with connections for connecting the valve to a pipe line.

A valve plug 12, sometimes called a cone, is provided which is preferably tapering and the body is provided with a tapering seating bore to receive the said plug. A stem 14 associated with the plug extends upwardly therefrom and it, as well as a part 16 associated with the plug, may be journalled in the cap 4 for reciprocating and rotating movements.

It is ordinary practice to provide a stuffing box for the stem or spindle of the plug and this may be in the form of a gland 18 disposed on the upper side of a packing 20.

The gland 18 in the form of the invention shown is urged downwardly by bolts 22, or the said gland may be of the screw type if desired. A pilot or lower journal 24 is provided on the plug 12 which has a bearing in the body which together with the upper part of the plug and stem which are journalled in the cap guide the plug for its reciprocating and rotating movements.

The plug is movable up and down between seated and non-seated positions in the bore and is rotatable between open and closed positions. In operation the plug is moved upwardly from off its seat, rotated and then reseated.

A collar 30 is rotatable around the upper part of the cap 4 and is held against axial movements. It may be formed of two halves bolted together as by bolts 32 as shown. Links 34 are pivoted at 36 to the collar in any suitable way and the lower ends of the links 34 as shown in the drawings are received in slots 31 of the collar. The upper end of the stem or spindle 14 is threaded at 38 and collars 40 and 42 are in screw-threaded engagement therewith. A yoke 44 is provided on the spindle between the collars 40 and 42 which may be moved up and down by the collars for locating the yoke on the spindle in various positions of adjustment. The yoke is non-rotatable relative to the spindle and this may be accomplished by means of a key 39 in the spindle which is disposed in a slot of yoke, as shown in Fig. 9.

An operating member in the form of a lever 50 having a manually engageable handle part 52 has lugs 54 which are pivotally connected at 56 to the yoke 44. Slots 58 in opposite sides of the operating member receive the upper ends of the links 34 which are pivotally connected at 60 to the operating member.

The parts are so arranged that as the lever 50 is swung up and down the spindle 14 and thereby the plug 12 is raised and lowered or moved between seated and non-seated positions. In Fig. 1, lever 50 is in the non-seated position of the plug. When swung downwardly or clockwise, it is then in a position wherein the plug is seated in its bore in the body.

A stop 62 of the operating member engages with a stop 64 of the yoke as shown to limit the movement of the lever in one direction. Another stop 66 and stop 68 of the yoke engage when the operating member is in plug seated position. When the lever is swung upwardly from the position shown in Fig. 1, it may be rotated to rotate the plug between its open and closed positions. As stated, in Fig. 1 the lever 50 is shown in an elevated or plug unseated position, and for clearness, is shown as being midway between open and closed positions of the plug.

The operating mechanism works with a toggle action so that the operating member is releasably locked in its plug seating position. Adjustment is provided by moving the collars 40 and 42 along the spindle to move and position the yoke. This makes it possible to adjust the parts so that the plug may be forced into the desired and proper seating position by means of the operating mechanism and any inaccuracy in machining or assembling of the parts may be easily and readily compensated for.

According to the invention it is desired to supply a sealing and lubricating medium to the coacting surfaces of the plug and body structure so as to prevent leakage and facilitate ease in operation and the sealing and/or lubricating medium will be hereinafter called medium.

To that end, groove 70 is provided in the coacting surfaces of the plug and body. These are preferably around the ports 8 and 10 and connected by a communicating groove indicated by 72. It will be understood that the grooves and as many as desired may be in the plug or body or both or partly in the plug and partly in the body.

Cylinders 72 are provided which have pistons 74 reciprocable therein. The pistons may be maintained in elevated positions by springs 76 interposed between the upper ends or sides of the cylinders and collars 78 on rods 80 associated with the pistons.

A bracket or connection 82 is associated with the body and cylinders and it has passageways or ducts such as 84 and 86 in communication with the cylinders and with a passageway or passageways such as 88 in the body leading to at least one of the grooves 72 of the seating surfaces of the body and cap.

The cylinders are positioned so that the rods 80 are engaged by the operating member when it is moved to seat the plug in either the open or closed positions of the plug. That is, when the operating member has been swung horizontally to position the plug for moving it downwardly to seated position and is swung downwardly it engages a piston rod 89 to force it downwardly and thereby causes the piston to force the medium within the cylinder through a passageway into the grooves around the seating surfaces of the plug and body. Therefore, each time that the plug in open or closed position is moved to seated position a supply of medium is forced into the grooves to seal the plug thereby eliminating leakage and supplying lubricant to facilitate ease in unseating the plug.

In addition to the grooves associated with the seating surfaces of the plug, it will be obvious that it is an easy matter to provide communication between the one or both cylinders and the bearings for the upper and lower ends of the plug so that the said bearings will receive a charge of medium.

Figure 4:
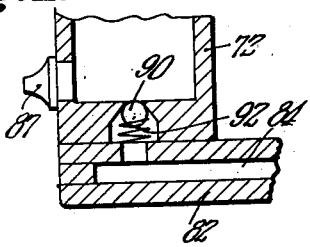
Fig. 4 is a detailed enlarged sectional elevational view to explain certain features of the invention.

It will be desired as shown in Fig. 4 to provide some means to prevent the sealing medium from being forced from one cylinder to another. To that end a check valve or valves may be placed in the communicating passageways or cylinders.

In Fig. 4 there is shown a check valve 90 which is in the form of a ball that is urged upwardly by a spring 92. As the medium is forced downwardly from the cylinder 72 by a piston therein, it forces the valve downwardly so as to pass thereby. When pressure is exerted upwardly against the valve by the other cylinder, it assumes its seated position to prevent the medium being forced upwardly.

Stops 96 and 98 on the member 30 coact with stops 100 and 102 on the cap so that the operating mechanism is limited in its horizontal rotation thereby to accurately position the plug in either open or closed position.

The cylinders may be supplied with lubricant in any suitable manner as for instance by pressure means applied to a fitting indicated at 87 which as usual includes a check valve.

From the foregoing it will be observed that the plug is moved between seated and non-seated positions and between open and closed positions by a novel operating mechanism which is readily adjustable and that means for supplying a lubricating and sealing medium is operable by the operating means.

In the foregoing the pistons are depressed to cause the medium to be forced from the cylinders but it will be possible to construct the apparatus so that upward movements of the pistons will bring about feeding of the medium.

In some cases it may be desired to employ a single cylinder and piston operable by the operating means in its valve open and closed positions. To that end as shown in Figs. 5 and 6 the operating member 110 has parts 112 for entering a slot of the piston rod 116. With this arrangement as the operating member is moved from the neutral central position shown in Fig. 6 to the closed or open position of the plug a part 112 of the operating member enters the slot 114. Then when the operating member is swung to move the plug vertically of the bore the rod 116 is reciprocated to actuate the piston and feed the medium.

As shown in Fig. 7 the invention is applicable to operating mechanism for operating the plug. In Fig. 7 a casing is shown at 120 and a cross head 122 is reciprocable back and forth on rods 124. A valve stem is represented by 126 and a lever 128 is threadably connected thereto and to the crosshead 122 by a link 130. A part 132 on the cross head engages with arms 134 and 136 of a member 138 fixed to the stem 126. As the crosshead is moved back and forth the levers 128 and 138 swing back and forth so that the plug is moved up and down between seated and non-seated positions and rotated between open and closed positions.

Cylinders 140 supported by brackets 142 from the casing 120 have pistons therein provided with rods 144 and levers 146 having angularly disposed arms are pivoted as shown. An arm of the levers are arranged to lie in the path of movement of a part 148 of the crosshead and the other arms are arranged to act on the piston rods all as shown. As the crosshead moves between open and closed positions of the plug the levers are operated and in turn act on the rods so that medium is fed from the cylinders which may be connected by pipes such as 150 to grooves and other parts that it is desired to supply the medium to.

According to the invention shown in Fig. 8 the medium is caused to be fed accordingly as the plug is moved to seated position. To that end a lower pivot part 160 of the plug 162 is provided with a packing or packings 164 and with an opening 166 leading to a passageway 168 which is in communication with grooves 170. A member 172 in the lower part of the plug has an opening therethrough and a closure member 174 is spring pressed downwardly to close the opening.

A reservoir 176 for the medium is connected by a conduit 178 to the valve body through a fitting 180. A passageway 182 in the fitting is normally closed by a spring pressed closure member 184 as shown. A pressure member 186 in the reservoir is urged downwardly by a spring 188 disposed between the member 186 and a cover of the reservoir.

A passageway 190 is connected to a passageway 192 associated with the upper plug pivot as shown.

In the form of the invention just described as the plug is moved upwardly from its seated position medium is drawn into the space below the plug pivot 160 and when it is moved downwardly to seated position the said pivot part acts as a piston on the medium to force it upwardly. Thus the plug in its operation brings about feeding of the medium to the various places where it is desired and needed.

Various novel features and advantages of the invention will be observed from the foregoing and various changes and modifications may be made without departing from the spirit and scope of the invention. What it is desired to claim and secure by Letters Patent of the United States is:

1. A valve apparatus comprising in combination, a body having a plug bore and a chamber, a plug reciprocable in said bore having a part reciprocable in said chamber, channel means associated with the coacting surfaces of said plug and body, lubricant supplying means, connections between said means and said chamber and between said channel means and chamber, valve means in said connections, all adapted and arranged whereby as the part of the plug moves in the said chamber in one direction lubricant is fed to said chamber and when moved in an opposite direction lubricant is fed from the chamber to the channel means.

2. A valve apparatus comprising in combination, a body having a plug bore and a chamber, a plug reciprocable in said bore having a part reciprocable in said chamber, channel means associated with the coacting surfaces of said plug and body, lubricant supplying means, and connections between said means and said chamber and between said channel means and chamber, all adapted and arranged whereby as said part of the plug moves in said chamber in one direction lubricant is fed to said chamber and when said part moves in an opposite direction lubricant is fed from said chamber to said channel means.

DAVID D. GOLDBERG.